United States Patent
Boyland

[11] Patent Number: 5,960,745
[45] Date of Patent: Oct. 5, 1999

[54] HORSE GROOMING DEVICE

[76] Inventor: Leslie J. Boyland, 13101 River Rd., Potomac, Md. 20854

[21] Appl. No.: 09/164,364

[22] Filed: Oct. 1, 1998

[51] Int. Cl.[6] .................................................. A01K 13/00
[52] U.S. Cl. .......................... 119/613; 119/615; 119/631; 168/48.1; 132/120
[58] Field of Search ................................... 119/612, 611, 119/613, 614, 615, 616, 617, 618, 619, 620, 625, 631, 664; 168/48.1; 132/120, 121

[56] References Cited

U.S. PATENT DOCUMENTS

| | | | |
|---|---|---|---|
| 82,172 | 9/1868 | Stanley | 119/613 |
| 106,680 | 8/1870 | Firey | 132/120 |
| 115,488 | 5/1871 | Lanston . | |
| 186,652 | 1/1877 | White | 119/631 |
| 200,218 | 2/1878 | Nicholson . | |
| 202,161 | 4/1878 | Finley | 119/613 |
| 202,410 | 4/1878 | Cole . | |
| 246,526 | 8/1881 | Manker | 119/613 |
| 862,918 | 8/1907 | Howard | 119/615 |
| 863,457 | 8/1907 | Seymour | 119/613 |
| 1,052,312 | 2/1913 | Carling . | |
| 1,078,556 | 11/1913 | Rogers . | |
| 1,085,063 | 1/1914 | Prouty et al. | 119/617 |
| 1,278,074 | 9/1918 | Phelps | 119/615 |
| 1,366,762 | 1/1921 | Ault . | |
| 1,658,706 | 5/1928 | Carrott . | |
| 1,748,950 | 3/1930 | Goldberg | 119/632 |
| 2,464,321 | 10/1949 | Konczal . | |
| 4,367,798 | 1/1983 | Sabol | 168/45 |
| 4,799,487 | 1/1989 | Gordon | 119/631 |
| 5,060,337 | 10/1991 | Van Niekerk . | |
| 5,564,148 | 10/1996 | Prevost et al. . | |

*Primary Examiner*—Michael J. Carone
*Assistant Examiner*—James S. Bergin
*Attorney, Agent, or Firm*—Watson Cole Grindle Watson P.L.L.C.

[57] ABSTRACT

A grooming brush for a horse having both relatively stiff and relatively flexible bristles extending in generally opposite directions to one another. A currycomb is formed by projections extending from the sides of the brush, and a rigid hoof pick is supported on one end.

3 Claims, 1 Drawing Sheet

HORSE GROOMING DEVICE

FIELD OF THE INVENTION

The invention relates to a grooming brush. More specifically, the invention relates to a grooming brush for a horse incorporating a plurality of bristle forms, means defining a currycomb, and a hoof pick.

BACKGROUND OF THE INVENTION

The benefits of grooming horses are well known and include maintaining the health of the animal, and improving the attractiveness of the riding experience. Grooming acts to remove hair that has been shed from the coat of the animal, dislodge parasites, and cleanse the coat of mud, burrs, dust, and other detritus. Grooming also stimulates the skin underlying the coat, and may improve circulation. Among the activities that comprise grooming, are removal of stones, mud, and vegetable matter from the hooves and shoes. A variety of implements have been used over time to perform grooming tasks. The present invention relates to an integrated device that incorporates several of the implements necessary or helpful for horse grooming in a single convenient tool.

SUMMARY OF THE INVENTION

The invention relates to a grooming device adapted to perform the various tasks associated with horse grooming, including brushing, currying, and hoof-picking. The device includes both stiff and relatively flexible bristles, disposed on opposite surfaces of a brush body. These bristles are designed to remove foreign material of a more or less adhesive nature, and of varying rheology stuck in the coat of the horse. The bristles are also adapted to remove excess hair shed by the animal and trapped in its coat, or loosely bound in the follicles of the scalp. In addition to the bristles, the invention incorporates a currycomb, consisting of a plurality of bumps or projections. The currycomb bumps are disposed upon a peripheral side surface of the body of the brush and are adapted to remove hair and other material from the coat of the animal. In addition to the aforementioned features, the invention also incorporates a handle adapted to allow convenient manipulation of the device during its application to the horse. Also, in addition to the aforementioned features, the device incorporates a rigid hoof pick, fixedly attached to the terminal end of the handle. The hoof pick is adapted to remove various foreign objects and materials from the hooves and shoes of the animal being groomed.

DETAILED DESCRIPTION OF THE INVENTION

Figure 1:
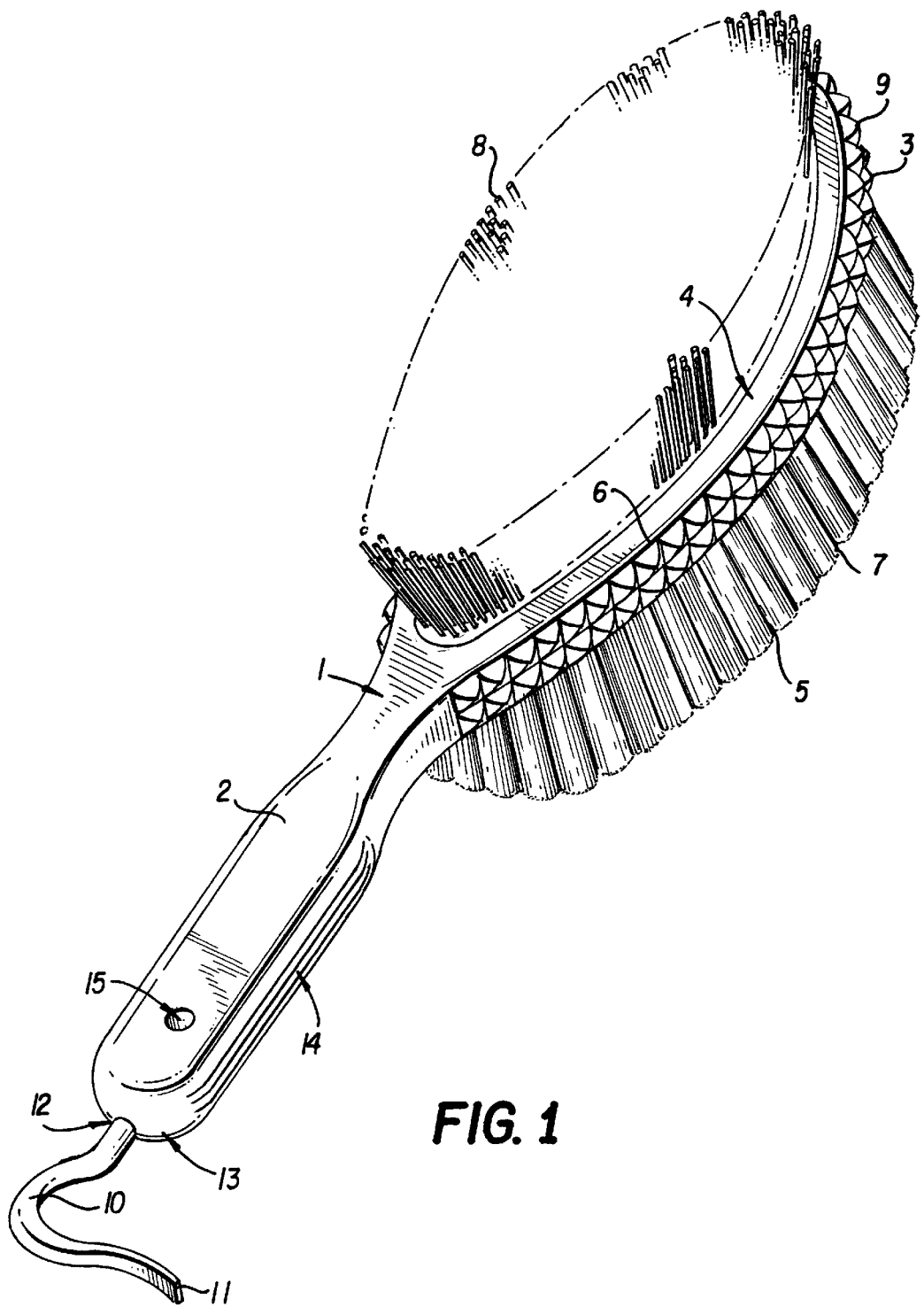
FIG. 1 is a top perspective view of an embodiment of the grooming device according to the present invention.

In the preferred embodiment, the brush comprises a body 1 made, for example, of finished wood or hard rubber. The body includes a handle region 2 and a bristle support region 3. The bristle support region 3 includes a first surface 4 and a second opposite surface 5, with a side surface 6 extending therebetween. A plurality of relatively flexible regular bristles 7 is affixed to the second surface 5 according to bristle attachment methods well known in the art. A plurality of relatively stiff metallic bristles 8 is affixed to the first surface 4 according to bristle attachment methods well known in the art. Bristles 8 are substantially straight as seen in the drawing.

The side surface 6 supports a currycomb comprising a plurality of pyramidal projections 9 extending outwardly from the side surface 6. The projections 9 are of substantially uniform size, and the currycomb is disposed at opposite sides of the body and extends around the end of the body at the bristle support region 3 of the body 1. The currycomb may be integrally formed in the body 1 by machining or molding. Alternately, the currycomb may be formed in a strip of hard rubber secured to the side surface 6 by an adhesive, or other suitable method. The handle 2 may have grooves 14 formed therein to enhance the grip. Also the handle 2 may have a hole 15 formed therein to receive a rope or thong.

The handle incorporates a rigid hoof pick 10 formed, for example, of metal with a working end 11 and an opposite attachment end 12. The working end of the hoof pick is adapted to the removal of material from the hooves and horseshoes of the animal being groomed. The hoof pick 10 is fixedly attached to the handle region 2 of the body 1 by securing the attachment end of the hoof pick into a suitable hole formed in the terminal end 13 of the handle region by application of an adhesive, or other suitable method.

The invention has been described with reference to a preferred embodiment. Obviously, various modifications, alterations, and other embodiments will occur to others upon reading and understanding this specification. It is our intention to include all such modifications, alterations, and alternate embodiments insofar as they come within the scope of the appended claims or the equivalent thereof.

What is claimed is:

1. A horse grooming device comprising a body defining a handle region including one end of the body and a bristle support region including the opposite end of the body, said bristle support region having opposite surfaces and a side surface extending between said opposite surfaces and extending around said opposite end of the body, a first plurality of bristles supported by one of said surfaces, a second plurality of bristles supported by the other of said surfaces, all of said first plurality of bristles being substantially straight metallic stiff elements, all of the second plurality of bristles being flexible elements, said side surface including a plurality of outwardly extending projections of substantially uniform size defining a currycomb at opposite sides of the body and extending around said opposite end of the body, and a rigid hoof pick being fixedly attached to said one end of the body and extending therefrom.

2. A horse grooming device according to claim 1, wherein said outwardly extending projections are pyramidal in shape, said pyramids being oriented such that the base of each of said pyramids is proximate to said side surface.

3. A horse grooming device according to claim 1, wherein said handle region includes a through hole adapted to contain a thong.

* * * * *